United States Patent [19]

Tani et al.

[11] Patent Number: 4,789,413

[45] Date of Patent: Dec. 6, 1988

[54] PROCESS FOR PREPARING A GAS PERMEABLE ADHESIVE TAPE

[75] Inventors: Naoyuki Tani, Hiranomiya; Motomu Ueno, Chihayaakasaka; Kusutaro Yoshida, Sakai; Yukio Mizukami, Hirakata, all of Japan

[73] Assignee: Sankyo Chemical Co., Ltd., Kashihara, Japan

[21] Appl. No.: 872,603

[22] Filed: Jun. 10, 1986

[30] Foreign Application Priority Data

Jun. 12, 1985 [JP] Japan ................. 60-127851

[51] Int. Cl.$^4$ ............... B32B 5/18; B32B 31/00; B29D 1/00; C09J 7/02
[52] U.S. Cl. ..................... 156/77; 156/231; 156/289; 264/53; 427/245; 428/355; 521/78
[58] Field of Search .......... 156/77, 79, 230, 231, 156/238, 246, 249, 289; 427/208.6, 243, 245, 246, 71; 428/40, 352, 355; 128/155, 156; 24/DIG. 11; 264/45.4, 45.6, 53, 51; 521/61, 63, 64, 65, 78

[56] References Cited

U.S. PATENT DOCUMENTS

| | | |
|---|---|---|
| 3,121,021 | 2/1964 | Copeland . |
| 3,789,027 | 1/1974 | Träubel et al. ............... 427/245 |
| 3,920,588 | 11/1975 | Träubel et al. ............... 521/99 |
| 3,968,293 | 7/1976 | Cunningham et al. ........... 427/245 |
| 3,979,532 | 9/1976 | Mück et al. .................. 427/245 |
| 4,029,534 | 6/1977 | Bocks et al. ................. 521/64 |
| 4,146,027 | 3/1979 | Hoey ......................... 128/156 |
| 4,163,822 | 8/1979 | Walter ....................... 156/246 |
| 4,207,128 | 6/1980 | Träubel et al. ............... 156/77 |
| 4,436,839 | 3/1984 | Behnke et al. ................ 521/64 |
| 4,559,369 | 12/1985 | Bauman et al. ................ 521/98 |
| 4,663,358 | 5/1987 | Hyon et al. .................. 521/64 |

FOREIGN PATENT DOCUMENTS 51-033811 3/1976 Japan .
57-182375 11/1982 Japan .

*Primary Examiner*—Donald E. Czaja
*Assistant Examiner*—Louis Falasco
*Attorney, Agent, or Firm*—Sandler & Greenblum

[57] ABSTRACT

A process for preparing permeable adhesive tapes, which comprises dispersing water or water and a water absorptive high-molecular weight compound homogeneously in a solution of a natural or synthethic rubber or acrylic pressure sensitive adhesive agent in an organic solvent, applying the dispersion onto a releasing agent applied sheet, drying the adhesive agent applied sheet, and laminating a porous backing material on the adhesive agent applied surface to obtain a permeable adhesive tape.

18 Claims, No Drawings

PROCESS FOR PREPARING A GAS PERMEABLE ADHESIVE TAPE

BACKGROUND OF THE INVENTION

1. Field of the Invention

This invention relates to a process for preparing permeable adhesive tapes. More particularly, it relates to an industrially advantageous process for preparing permeable adhesive tapes which comprises making holes with the aid of water, or water and a water absorptive high-molecular weight compound.

2. Description of the Prior Art

The present invention is specifically directed to adhesive tapes used for protecting wounds or others. The adhesive tapes referred to herein are meant to include adhesive bandages, sticking plasters, bandages, surgical cloths and so forth by way of example. Such adhesive tapes cause maceration when adhered and maintained on skin for a long time. For avoiding this problem, it is desirous that tapes have permeability. In order to solve this problem, the prior arts provides holes in tapes by using the following many methods:

(i) mechanically, for instance, by punching the product:
(ii) chemically, for instance, by incorporating a substance which can be leached out by a solvent into the product;
(iii) physically, for instance, by causing the product to foam by expelling a solvent during drying, thus making the material microporous.
(iv) by physical interaction between the backing material and the adhesive, for example, by allowing the adhesive to dry in contact with a fabric backing material which causes the adhesive to become porous.

The method of this invention relates to rendering the material microporous, as mentioned in (iii). Examples of the prior arts classified in (iii) are "Micropore" (trademark of 3M in USA), tapes disclosed in Japanese Unexamined Patent Publication No. 57(1982)-182375 and the like. For instance, the above No. 57(1982)-182375 discloses that an adhesive layer is formed by using a dispersion of an adhesive agent in an organic solvent and is given for permeability therein.

SUMMARY OF THE INVENTION

This invention is to provide a process for making conveniently homogeneous holes in an adhesive layer which comprises dispensing on intervening water or water and a water absorptive high-molecular weight compound in a solution of an adhesive agent in an organic solvent and subjecting it to drying.

Thus, in accordance with this invention, it provides a process for preparing permeable adhesive tapes which is characterized by dispersing water or water and a water absorptive high-molecular weight compound homogeneously in a solution of a natural or synthetic rubber or acrylic pressure sensitive adhesive agent in an organic solvent, applying the dispersion onto a releasing agent applied sheet, drying the adhesive agent applied sheet, and laminating a porous backing material on the adhesive agent applied surface to obtain a permeable adhesive tape.

DESCRIPTION OF THE PREFERRED EMBODIMENT

The term of "permeable" as used in this invention means one to permeate gas as well as liquid water. Liquid water can be generally permeated under a slight pressure. Its extent can be measured in accordance with JIS P8117, "Test method for permeability of paper and board paper", which is expressed as average seconds which required to pass 300 ml of air through a test tape having 645 $mm^2$.

The adhesive agents employed in the invention are natural or synthetic rubber or acrylic pressure sensitive adhesive agents and may be any ones which can be used in the art.

The adhesive agents employed in the invention are available as those dispersed or dissolved in an organic solvent. Such solvent includes, for instance, ethyl acetate, toluene, hexane, mineral oils, petroleum ether or the like.

The adhesive agent also may involve one or more kinds of tackifier, plasticizer, antioxidant or preservative.

Water loading which is a characteristic of the invention is 5–50 weight parts, preferably 10–40 weight parts to a solution of rubber pressure sensitive adhesive agent in organic solvent and 5–40 weight parts, preferably 5–30 weight parts to a solution of acrylic pressure sensitive adhesive agent in organic solvent Also, "water absorptive high-molecular weight compound" as used in the invention means one which can swell upon the absorption of water in a quantity from several hundred folds to four folds of said high-molecular weight compounds own weight, without dissolving in water and separating water from the swollen product under pressure.

It's examples are as starches, starch-acrylonitrile graft polymer, starch-acrylic acid graft polymer, starch-styrenesulfonic acid graft polymer, starch-vinylsulfonic acid graft polymer and so forth; as celluloses, cellulose-acrylonitrile graft polymer, cellulose-styrenesulfonic acid graft polymer, cross-linked polymer of carboxymethylcellulose and so forth; as polyvinylalcohols, polyvinylalcohol-crosslinked polymer, acryl-vinylacetate saponified product and so forth; as acryls, polyacrylate crosslinked product, polyacrylnitrile polymer saponified product and so forth; as polyethyleneoxides, polyethyleneglycoldiacrylate cross-linked polymer and so forth; and other polymers containing carboxyl group, carboxylic acid salt group, hydroxy group or sulfonic acid group, or polyvinylpyrolidone crosslinked polymer.

The use of the water absorptive high-molecular weight compound is 1/3000–1/10 weight parts for water, preferably 1/600–1/20 weight parts for water. The particle size of the water absorptive high-molecular weight compound is suitably less than 60 $\mu$ and preferably less than 40$\mu$, because the smaller is easier to disperse in water.

A homogeneous dispersion of water or water and a water absorptive high-molecular weight compound in a solution of a natural or synthetic rubber or acrylic pressure sensitive adhesive agent in an organic solvent is applied onto a releasing agent applied sheet. The releasing agent applied sheet is for example silicone applied paper, silicone applied film, or the like.

The adhesive agent may be applied in such amount as forming a desired thickness, since deterioration of permeability due to the thickness is small as it is apparent from Examples given hereinafter. For applying the adhesive agent, any conventional method may be employed.

In the drying step after the application of the adhesive agent, a conventionally used multistage zone drier is used for example at a temperature of 40°–110° C. However, any other drying apparatus may also be used.

The residence time for the drying is suitably 3–10 minutes.

In operations as described above, an adhesive agent layer provided with holes is formed on the releasing agent applied sheet. On the adhesive agent layer so formed, a layer of a porous backing material for tapes, for example, as a porous backing material layer, fabric or non-woven fabric and as a porous backing material, rough mesh polymer or polymer foam having good permeability, is laminated.

Tapes thus obtained are usually wound up into a roll or cut down into sheets, as they are still laminated with the releasing agent applied sheet. When tapes, from which the releasing agent applied sheet is removed, are stored in the form wound into a roll, it is desirable to use a backing material to which previous coating with a releasing agent is applied or to apply a protecting agent onto the adhesive agent layer, so that the adhesive agent layer may not adhere to the backing material. Tapes still laminated with the releasing agent applied sheet used on preparing them are useful also for diminishing pollution or tainting of the adhesive agent layer. It is also possible to sterilize the final tapes by radiation or other means.

OPERATIONS

By adding and dispersing water preferably in the form of a solution of a pressure sensitive adhesive agent in an organic solvent and applying the dispersion onto a releasing sheet, a discontinuous coating film comprising the pressure sensitive adhesive agent in which water is dispersed is obtained. Although not wishing to be bound by any particular theory, it is believed that, in the following drying step, that is, when the organic solvent is removed to form the adhesive agent layer, the water prevents fusing and adhering of the adhesive agent and holes are formed at positions where the water intervenes.

When water and a water absorptive high-molecular weight compounds are added to a solution of a pressure sensitive adhesive agent in an organic solvent, the dispersion of water becomes more homogeneous and a discontinuous coating film in which water is dispersed more homogeneously is obtained. It is considered that, since the water absorptive high-molecular weight compound is not dissolved in water and its swollen product does not allow the absorbed water to split off even under pressure, fusing and adhering of the adhesive agent are prevented until the way of drying and so the adhesive agent layer is provided with more stable holes.

EXAMPLES

The invention will now be explained in detail by the following non-limiting Examples.

Examples 1 and 2 the process for preparing permeable adhesive tape in accordance with the present invention using a natural rubber pressure sensitive adhesive agent and water, Example 3 describes the process of the present invention using an acrylic pressure sensitive adhesive agent and water and Example 4 describes the process of the present invention using an acrylic pressure sensitive adhesive agent, water and a water absorptive high-molecular weight compound. Example 5 describes the process of the present invention using an acrylic pressure sensitive adhesive agent and water and the preparing process of the present invention using an acrylic pressure sensitive adhesive agent, water and a water absorptive high-molecular weight compound.

EXAMPLE 1

| Preparation-1 | |
| --- | --- |
| Natural rubber | 18.0 weight parts |
| Zinc white | 5.9 weight parts |
| Polyisobutylene (viscosity-average molecular weight: 81,000–99,000) | 5.0 weight parts |
| 2,6-Di-tert-butyl-p-cresol | 0.1 weight parts |
| Hydrogenated rosin glycerol ester | 23.0 weight parts |
| n-Hexane | 48.0 weight parts |

A rubber pressure sensitive adhesive agent, "Preparation-1" consisting of the above ingredients, was prepared. To the preparations were added water and a crosslinking agent NOCCELER T.R.A. [dipentamethylene thiuram tetrasulfide, a product of Oh-uchi Shinko Chemical Co., Ltd.] as shown in Table-1, and dispersed homogeneously to obtain a slurry product.

The slurry was applied onto a silicone applied releasing paper by means of a roll type knife coater to a swollen thickness of 280–330$\mu$. By passing through a multistage zone drier at a temperature of 60°–110° C. and a staying time of 3–10 minutes, a dry adhesive agent layer having a thickness of 70–80$\mu$ and containing less than 1% (inclusive) of the remaining solvent was obtained. The dry adhesive agent layer getting out of the drier was laminated on a cotton fabric [NY 3022, a product of Johno Senko Co., Ltd.]of 1030 mm width, which was supplied from a suitably installed roll, and the adhesive agent was made to adhere tightly to the cotton fabric. By cutting down the product so obtained into a width of 50 mm, a tape product was obtained. The results of measuring permeability and adhesiveness of the product at normal state and after aging are shown in Table-1.

In the following Tables, the units of numerical values are second/300 ml for permeability, g/20 mm width for adhesiveness, and weight parts for materials.

TABLE 1

| No. | | 1 | 2 | 3 | 4 | 5 | 6 | 7 |
| --- | --- | --- | --- | --- | --- | --- | --- | --- |
| Preparation-1 | | 100 | 100 | 100 | 100 | 100 | 100 | 100 |
| NOCCELER T.R.A. | | 0 | 0.13 | 0.13 | 0.13 | 0.13 | 0.13 | 0.13 |
| Water | | 0 | 0 | 10 | 20 | 30 | 40 | 50 |
| Normal state | Permeability | 622 | 243 | 7.7 | 2.8 | 1.3 | less than 1 (inclusive) | less than 1 (inclusive) |
| | Adhesiveness | 391 | 405 | 393 | 380 | 375 | 360 | 349 |
| After aging | Permeability | 805 | 280 | 11.3 | 5.0 | 2.3 | 1.2 | 1.2 |
| | Adhesiveness | 305 | 371 | 370 | 371 | 360 | 339 | 337 |

EXAMPLE 2

The results of measurements for products having a thin adhesive agent layer (the thickness of the dry adhesive agent layer was 30μ) are shown in Table-2. The method of processing and the method of measuring were same as those of Example 1.

TABLE 2

| No. | | 8 | 9 | 10 | 11 |
|---|---|---|---|---|---|
| Preparation-1 | | 100 | 100 | 100 | 100 |
| NOCCELER T.R.A. | | 0 | 0 | 0.13 | 0.13 |
| Water | | 0 | 20 | 0 | 20 |
| Normal state | Permeability | 189 | 1.5 | 90 | less than 1 (inclusive) |
| | Adhesiveness | 327 | 335 | 293 | 272 |
| After aging | Permeability | 250 | 3.8 | 105 | 3.8 |
| | Adhesiveness | 222 | 247 | 251 | 215 |

EXAMPLE 3

To an organic solvent type acrylic pressure sensitive adhesive agent FINETAC MD-327 [a product of Dai Nihon Ink Chemical Co., Ltd.] was added a crosslinking agent ORGATIX AL-80 [a product of Matsumoto Kosho Ltd.]. Then, water was added to the mixture as shown in Table-3 and dispersed homogeneously to obtain a slurry product. The slurry was applied onto a silicone applied releasing paper by means of a roll type knife coater to a swollen thickness of 200–250μ. By passing through a multistage zone drier at a staying time of 3–10 minutes, a dry adhesive agent layer having a thickness of 50–60μ and containing less than 1% (inclusive) of the remaining solvent was obtained. The dry adhesive agent layer getting out of the drier was laminated on a non-woven fabric [BEMLIESE CF 501, a product of Asahi Chemical Industry Co., Ltd.], which was supplied from a suitably installed roll, and the adhesive agent was made to adhere tightly to the non-woven fabric to obtain the product. The results of measuring permeability and adhesiveness of the product, as done in Example 1, are shown in Table-3.

TABLE 3

| No. | | 12 | 13 | 14 | 15 | 16 |
|---|---|---|---|---|---|---|
| FINETAC MD-327 | | 100 | 100 | 100 | 100 | 100 |
| ORGATIX AL-80 | | 1.5 | 1.5 | 1.5 | 1.5 | 1.5 |
| Water | | 0 | 10 | 20 | 30 | 40 |
| Normal state | Permeability | More than 50000 (inclusive) | 318 | 171 | 19 | 16 |
| | Adhesiveness | 805 | 678 | 680 | 675 | 655 |
| After aging | Permeability | More than 50000 (inclusive) | 351 | 201 | 23 | 21 |
| | Adhesiveness | 759 | 670 | 680 | 621 | 618 |

EXAMPLE 4

To an organic solvent type acrylic pressure sensitive adhesive agent AROSET 8043 [a product of Nihon Shokubai Chemical Industry Co., Ltd.] was added a crosslinking agent ORGATIX AL-80. An aqueous solution of a water absorptive high-molecular weight compound [for example, SANWED IM-1000MPS, a product of Sanyo Chemical Industries, Ltd.] was prepared, and then added in a minor amount as shown in Table-4 to the mixture and dispersed homogeneously in the mixture to obtain a slurry product. By the same processing as Example 3, the product was obtained. The results of measuring permeability and adhesiveness of the product, as done in Example 1, are shown in Table-4.

TABLE 4

| No. | | 17 | 18 | 19 | 20 | 21 |
|---|---|---|---|---|---|---|
| AROSET 8043 | | 100 | 100 | 100 | 100 | 100 |
| ORGATIX AL-80 | | 1.5 | 1.5 | 1.5 | 1.5 | 1.5 |
| Water | | 0 | 20 | 20 | 20 | 20 |
| SANWED IM-1000MPS | | 0 | 0 | 0.3 | 0.5 | 1.0 |
| Normal state | Permeability | More than 50000 (inclusive) | 180 | 1.6 | 0.7 | 0.7 |
| | Adhesiveness | 746 | 650 | 632 | 630 | 621 |
| After aging | Permeability | More than 50000 (inclusive) | 204 | 1.6 | 0.7 | 0.7 |
| | Adhesiveness | 723 | 631 | 615 | 614 | 608 |

EXAMPLE 5

A preparation consisting of 29.0 weight parts of 2-ethylhexyl acrylate, 8.1 weight parts of butyl acrylate, 2.5 weight parts of 2-hydroxyethyl acrylate, 0.5 weight part of acrylic acid, 0.06 weight part of benzoyl peroxide and 58.0 weight parts of ethyl acetate was polymerized in nitrozen current by an ordinary polymerization method to obtain an acrylic pressure sensitive adhesive agent (polymerization product-1). As shown in Table-5 and Table-6, the product was obtained by the same compounding as Examples 3 and 4 and the same processing as Example 3. The results of measuring permeability and adhesivenss of the product, as done in Example 1, are shown in Table-5 and Table-6.

TABLE 5

| No. | | 22 | 23 | 24 | 25 | 26 |
|---|---|---|---|---|---|---|
| Polymerization product-1 | | 100 | 100 | 100 | 100 | 100 |
| ORGATIX AL-80 | | 1.5 | 1.5 | 1.5 | 1.5 | 1.5 |
| Water | | 0 | 10 | 20 | 30 | 40 |
| Normal state | Permeability | More than 50000 (inclusive) | 323 | 165 | 19 | 15 |
| | Adhesiveness | 580 | 556 | 520 | 475 | 470 |
| After aging | Permeability | More than 55000 (inclusive) | 340 | 200 | 29 | 23 |
| | Adhesiveness | 571 | 532 | 506 | 459 | 450 |

TABLE 6

| No. | | 27 | 28 | 29 | 30 | 31 |
|---|---|---|---|---|---|---|
| Polymerization product-1 | | 100 | 100 | 100 | 100 | 100 |
| ORGATIX AL-80 | | 1.5 | 1.5 | 1.5 | 1.5 | 1.5 |
| Water | | 0 | 20 | 20 | 20 | 20 |
| SANWED IM-1000MPS | | 0 | 0 | 0.3 | 0.5 | 1.0 |
| Normal state | Permeability | More than 50000 (inclusive) | 165 | 1.5 | 0.7 | 0.7 |
| | Adhesiveness | 580 | 520 | 511 | 508 | 498 |
| After aging | Permeability | More than 50000 (inclusive) | 200 | 1.6 | 0.7 | 0.7 |
| | Adhesiveness | 571 | 506 | 503 | 500 | 407 |

The "adhesiveness" (g/20 mm width) used in the above explanation of the present invention is one determined according to JIS Z0237 "Test method for sticky tapes and sticky sheets", and the values after "aging" are those obtained by measuring permeability and adhesiveness after letting the product to stand under conditions of the temperature 70° C.×the load 20 g/cm$^2$ for 4 days and further at the temperature 23° C.×the humidity 65% for 1 day.

From Examples 1–5, it has been proved that the permeability rises significantly by adding water. However, when too much water is added, the water intervenes the adhesive agent too much to keep the continuity of the resulting dry adhesive agent layer, and as a result the adhesiveness of the product lowers.

Further, from the comparison of Example 1 with Example 2, it has been proved that the influence of increasing the thickness of the adhesive agent layer on the deterioration of the permeability of the product is small.

In addition, it has been proved in Example 4 that addition of water and a water absorptive high-molecular weight compound improves permeability more significantly as compared with addition of water alone.

According to the present invention wherein holes in the adhesive agent layer are formed by intervening water, a process of preparing permeable adhesive tapes, which is different from the prior arts, is provided.

The process of forming holes is very simple and has a significant effect of improving permeability.

Further, according to the process of this invention wherein water and a water absorptive high-molecular weight compound are added, more homogeneous and stable holes are formed in the adhesive agent layer and its permeability is further improved.

We claim:

1. A process for preparing permeable adhesive tapes comprising applying an homogeneous dispersion of water and a water absorptive high-molecular weight compound in a solution comprising an acrylic pressure sensitive adhesive agent in an organic solvent onto a sheet having a surface provided with a releasing agent, wherein said dispersion comprises water in an amount within the range of 5–40 parts by total weight of said solution, drying said sheet, and laminating a porous backing material on said surface of said sheet to obtain a permeable adhesive tape.

2. The process in accordance with claim 1, wherein said dispersion comprises said water absorptive high-molecular weight compound in an amount within the range of about of 1/3000–1/10 parts per part water.

3. The process in accordance with claim 1, wherein said dispersion comprises said water absorptive high-molecular weight compound in an amount within the range of 1/600–1/20 parts per part water.

4. The process in accordance with claim 1, wherein said water absorptive high-molecular weight compound is a water absorptive high-molecular weight compound selected from the group consisting of starch, cellulose, polyvinylalcohol, acryl and polyethylene.

5. The process in accordance with claim 1, wherein said drying is carried out at a temperature of 40–110 degrees C.

6. The process in accordance with claim 2, wherein said water absorptive high-molecular weight compound is a water absorptive high-molecular weight compound selected from the group consisting of starch, cellulose, polyvinylalcohol, acryl and polyethylene.

7. The process in accordance with claim 3, wherein said water absorptive high-molecular weight compound is a water absorptive high-molecular weight compound selected from the group consisting of starch, cellulose, polyvinylalcohol, acryl and polyethylene.

8. The process in accordance with claim 1, wherein said organic solvent is a member selected from the group consisting of ethylacetate, toluene, hexane, mineral oils, and petroleum ether.

9. The process in accordance with claim 1, wherein said dispersion comprises an adjuvant selected from the group consisting of tackifers, plasticizers, antioxidants, preservatives, and mixtrues of tackifers, plasticizers, antioxidnts and mixtures of one or more of tackifers, plasticizers, antioxidants and preservatives.

10. The process in accordance with claim 4, wherein said starch is a member selected from the group consisting of starch-acrylonitrile graft polymer, starch-acrylic graft polymer, starch-styrenesulfonic acid graft polymer, and starch-vinylsulfonic acid graft polymer.

11. The process in accordance with claim 4, wherein said cellulose is a member selected from the group consisting of cellulose-acrylonitrile graft polymer, cellulose-styrenesulfonic acid graft polymer, and cross-linked polymer of carboxymethylcellulose.

12. The process in accordance with claim 4, wherein said polyvinylalcohol is a member selected from the group consisting of polyvinyl-alcohol-cross-linked polymer, and acryl-vinyvlacetate saponified polymer.

13. The process in accordance with claim 4, wherein said acryls is a member selected from the group consisting of cross-linked polyacrylate, and a saponified polyacrylnitrile polymer.

14. The process in accordance with claim 1, wherein said water absorptive high-molecular weight compound is selected from the group consisting of a polyethyleneoxide; a polyethyleneglycol-diacrylate cross-linked polymer; polymers containing groups selected from the group consisting of carboxyl groups, carboxylic acid salt groups, hydroxyl groups, sulfonic acid groups; and polyvinyl-pyrolidone cross-linked polymers.

15. The process in accordance with claim 1, wherein the particles of said water absorptive high-molecular weight compound is less than about 60 microns.

16. The process in accordance with claim 15, wherein said particle size is less than about 40 microns.

17. A process for preparing permeable adhesive tapes, comprising applying an homogeneous dispersion of water and a water absorptive high-molecular weight compound in a solution comprising a pressure sensitive adhesive agent selected from the group consisting of natural rubber and synthetic rubber in an organic solvent onto a sheet having a surface provided with a releasing agent, wherein said dispersion comprises water in an amount within the range of 10–40 parts by total weight of said solution, onto a sheet having having a surface provided with a releasing agent, drying said sheet, and laminating a porous backing material on said surface of said sheet to obtain a permeable adhesive tape.

18. A process for preparing permeable adhesive tapes, comprising applying an homogeneous dispersion of water and a water absorptive high-molecular weight compound in a solution comprising an acrylic pressure sensitive adhesive agent in an organic solvent onto a sheet having a surface provided with a releasing agent, wherein said dispersion comprises water in an amount within the range of 5–30 parts by total weight of said solution, and laminating a porous backing material on said surface of said sheet to obtain a permeable adhesive.

* * * * *

UNITED STATES PATENT AND TRADEMARK OFFICE
CERTIFICATE OF CORRECTION

PATENT NO. : 4,789,413

DATED : December 6, 1988

INVENTOR(S) : Naoyuki TANI et al.

It is certified that error appears in the above-identified patent and that said Letters Patent is hereby corrected as shown below:

At column 1, line 22, change "arts" to ---art----.
At column 2, line 16, change "." to ---,--- after "plasticizer".
At column 2, line 32, change "It's" to ---Its---.
At column 4, line 1, insert ----describe---- after "and 2".
At column 7, line 32, change "an" to ---a---.
At column 8, line 24, change "vinyvlacetate" to ---vinylacetate---.
At column 8, line 26, change "acryls" to ---acryl---.
At column 8, line 52, change "having having" to ---having ---.

Signed and Sealed this

Twenty-ninth Day of December, 1992

Attest:

DOUGLAS B. COMER

*Attesting Officer*     Acting Commissioner of Patents and Trademarks